United States Patent [19]
Kalopissis et al.

[11] 3,865,542
[45] Feb. 11, 1975

[54] HAIR DYEING COMPOSITIONS CONTAINING POLYHYDROXYLATED POLYETHER NONIONIC SURFACTANTS

[75] Inventors: Gregoire Kalopissis, Paris; Guy Vanlerberghe, Montjay-la-Tour, both of France

[73] Assignee: L'Oreal, Paris, France

[22] Filed: Oct. 4, 1971

[21] Appl. No.: 186,524

Related U.S. Application Data

[63] Continuation-in-part of Ser. No. 846,929, Aug. 1, 1969, Pat. No. 3,666,671, which is a continuation-in-part of Ser. No. 780,300, Nov. 29, 1968, Pat. No. 3,578,719, which is a continuation-in-part of Ser. No. 544,095, April 21, 1966, abandoned.

[52] U.S. Cl............... 8/10.1, 8/10, 8/10.2, 8/11, 8/93, 106/266, 106/308 F, 106/308 G, 252/DIG. 1, 252/DIG. 13, 252/170, 252/173, 252/312, 252/351, 252/316, 252/548, 252/551, 260/613 B, 260/615 B, 424/63, 424/64, 424/70, 424/170

[51] Int. Cl............................................. A61k 7/12

[58] Field of Search ...... 106/266; 8/102, 10.1, 10.2, 8/10, 11, 93

[56] References Cited
UNITED STATES PATENTS

| | | | |
|---|---|---|---|
| 1,402,317 | 1/1922 | Rodebush | 260/636 |
| 2,089,569 | 8/1937 | Orthner et al. | 260/615 B UX |
| 2,131,142 | 9/1938 | Orthner et al. | 260/613 B UX |
| 2,643,211 | 6/1953 | DenBeste | 8/10.1 X |
| 2,763,269 | 9/1956 | DenBeste | 8/10.1 |
| 3,555,584 | 1/1971 | Kalopissis et al. | 8/10.1 |

FOREIGN PATENTS OR APPLICATIONS

| | | | |
|---|---|---|---|
| 1,022,878 | 3/1966 | Great Britain | 260/613 B |

*Primary Examiner*—Jerome D. Goldberg
*Assistant Examiner*—Vera C. Clarke
*Attorney, Agent, or Firm*—Cushman, Darby & Cushman

[57] ABSTRACT

A composition for dyeing hair comprises an aqueous solution of a hair dye and a compound having the formula $R_1O + C_2H_3O(CH_2OH)_n H$ wherein the repeating group is linear, R is a lipophile group and $n$ has a statistical average value greater than 1 and equal to or less than 10.

7 Claims, No Drawings

HAIR DYEING COMPOSITIONS CONTAINING POLYHYDROXYLATED POLYETHER NONIONIC SURFACTANTS

This application is a continuation-in-part of our application SN 846,929, filed Aug. 1, 1969, now U.S. Pat. No. 3,666,671, which is a continuation-in-part of our application Ser. No. 780,300, filed Nov. 29, 1968, now U.S. Pat. No 3,578,719, which in turn is a continuation-in-part of our application Ser. No. 544,095, filed Apr. 21, 1966, now abandoned.

There are quite a number of known non-ionic surface active agents the compositions and properties of which are quite varied.

Nevertheless the known products made from the conventional raw materials do not have simultaneously all the characteristics which are desired for certain cosmetic purposes.

For instance, the best detergents and foaming agents among those monoethers of polyethylene glycol which comprise a lipophile chain having at least 8 carbon atoms are generally the most irritating to the mucous membranes. Moreover, when mixed with cationic surface active agents the degree of irritation increases synergistically.

On the other hand, the derivatives of the polyols and the sugars, especially their esters, have been considered most useful because they are not irritating. They have, however, certain disadvantages which result from their composition. In particular, the non-selective character of the reactions used in their preparation results in the formation of a mixture of constituents having one or more lipophile chains per molecule. When these products are to be used for applications for which solubility in water is a prerequisite, they must therefore be painstakingly purified.

The hydrosolubility of these compounds may be improved by adding hydrophile substituents on the carbon chain or by adding ethylene oxide to the free hydroxyl groups. However, such compounds are not usually very good foaming agents, even when they comprise a medium length hydrocarbon chain. They are consequently used mainly as emulsifiers.

The object of the invention is to produce, from conventional commercial raw materials, new non-ionic surface-active agents which are stable, very hydrophilic, non-irritating, non-toxic and which may be used as emulsifiers, foaming agents, detergents, or wetting agents.

Another object of the present invention is to provide a method of preparing preferred new non-ionic surface-active compounds having the formula:

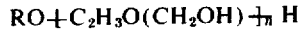

(I)

in which R represents a lipophile group that is a linear or branched alkyl or alkenyl, which has 8 to 22 carbon atoms or an alkyl aryl group which has 8 to 22 carbon atoms and has a linear or branched alkyl chain which has 1-18 carbon atoms, and in which $n$ has a statistical average value greater than 1 and less than 10 or equal to 10, essentially characterized by the fact that $n$ molecules of the glycerol epihalohydrin repeating group are linearly polyadded to a hydroxylated compound having the formula ROH, in which R has the significance indicated above, and that the resulting product is hydroxylated with a carboxylic acid salt.

A further object of the present invention is to provide the new article of manufacture which consists of non-ionic surface-active agents according to formula I made by the foregoing process.

Another object of the present invention is to provide as new articles of manufacture, the intermediate products obtainted while carrying out the above-mentioned process, after the polyaddition has taken place but before the hydroxylation, said intermediates having the formula:

(II)

in which R has the significance indicated above, $n$ has a statistical average value greater than 2 and less than 10 or equal to 10 and X represents a halogen.

Broadly, the present application covers the class of non-ionic surface-active agents described above and those which may be prepared from natural or synthetic aliphatic or alicyclic alcohols. The term "natural alcohols" is intended to include those derived, for example, from lanolin, natural waxes (e.g. beeswax), hydroabietic alcohols derived from resinous acids, and alcohols obtained by reducing cyclic fatty acids.

It is known that lanolin alcohols, for example, comprise up to 30 carbon atoms, and that they consist of a mixture of straight or branched chain iso and anteiso derivatives, which are members of the aliphatic series, and of alicyclic alcohols (sterols and triterpenic alcohols). The alcohols are found in lanolin, essentially in the form of esters of fatty acids. Hydrogenation yields a mixture comprising both the alcohols of the unsaponifiable material and those derived from the fatty acids of lanolin.

The preparation of lanolin alcohols by hydrogenation was described by Stickdorn, E. Konig and Birk in the Tenside review, 3, No. 2 (1966) p. 45.

"Elrolan" sold by VEB Deutsches Hydrierwerk and "Hydrolan R" sold by Occo International, Division of Millmaster Onyx Corporation, Jersey City, New Jersey U.S.A. are examples of alcohols of lanolin prepared by hydrogenation.

High molecular weight alcohols may be obtained in like manner from natural waxes, (beeswax, for example) and from resinous acids.

It is another object of the present application to provide new non-ionic surface-active agents having the formula:

(III)

in which $n$ has a statistical average value greater than 1 and less than 10 or equal to 10 and $R_1$ represents a hydrocarbon radical derived from aliphatic or alicyclic alcohols, of either natural or synthetic origin, which may comprise from 8 to 30 carbon atoms and a process of making these compounds. This process is essentially characterized by the fact that $n$ molecules of glycerol epihalohydrin are polycondensed on an alcohol having the formula $R_1OH$, in which $R_1$ has the significance hereinbefore indicated, the resulting product is then hydroxylated by means of carboxylic acid salt, and the ester thus formed is hydrolized or alcoholized.

It is a further object of the present invention to provide, as new compositions of matter, the non-ionic surface-active agents corresponding to formula (I) and (III) produced by the above process.

It is a still further object of the present invention to provide, as new compositions of matter, the intermediates which are obtained in the course of the above process, after completion of the polycondensation step and before hydroxylation, which intermediates correspond to the general formula:

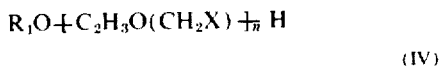

(IV)

in which $R_1$ has the significance hereinbefore indicated, $n$ has a statistical average value greater than 2 and less than 10 or equal to 10, and X represents a halogen.

It is clear that in the course of the polycondensation which constitutes the first step of the process according to the invention, a mixture of compounds corresponding to general formula (IV) is formed, but in these compounds the number of glycerol epihalohydrin molecules attached may be greater or less than the statistical average value of the number of molecules of glycerol epihalohydrin supplied per molecule of alcohol. Consequently, the process according to the invention makes it possible to obtain a mixture of compounds having hydrophilic chains the size of which is dependent on the value of the number $n$ in formula (IV), the group of values of n being statistically distributed about an average value corresponding to the number of molecules of glycerol epihalohydrin provided per molecule of alcohol.

But the important point, which represents one of the essential advantages of the process according to the invention, is that it leads to the formation of compounds having a single lipophile group for each hydrophile chain.

Moreover, it should be pointed out that the process according to the invention makes it possible to regulate the lipophile property of the resulting product by varying the value of the number $n$ of glycerol epihalohydrin molecules provided for each molecule of alcohol.

When $n$ is at least equal to one-third of the number of carbon atoms in the lipophile chain, the products are detergents which are soluble in water. Moreover, the derivatives in which the lipophile chain contains 10-14 carbon atoms make good foaming agents, while those in which the lipophile chain contains more than 14 carbon atoms are emulsifiers.

When $n$ is more than 10 the condensation becomes difficult because beyond this value, we obtain the phenomenon described in the JACS Vol. 82 Jan. 60 No. 1 (Pages 120-124) Latremouille, Merrall and Eastham, that is to say, the depolymerization of our products by formation of dioxane and rupture of chain links.

In a preferred embodiment of the invention the glycerol epihalohydrin is polycondensed in the presence of a Lewis acid catalyst such as boron trifluoride, stannic chloride, or antimony pentachloride, at a temperature between 25° and 160°C.

When boron trifluoride is used, this is introduced in the proportion of 1 to 2 percent of the total reaction mass and the reaction is preferably carried out at between 60° and 120°C.

The hydroxylation which constitutes the second step of the process makes it possible to avoid the disadvantages inherent in those reactions in which hydroxyl groups are directly substituted for halogens. It is well known that the preparation of hydroxylated compounds by hydrolysis of halogen derivatives is, in general, quite difficult, that the substitution is often incomplete, and that the presence of the mineral halides has an adverse effect on the solubility and makes it laborious to separate the desired end product. The hydroxylation step which is preferred to use in the practice of the present invention consists in reacting the halogen derivative of formula (IV) with an alkaline salt of carboxylic acid, preferably within a solvent which insures both the miscibility of the reagents and the easy separation of the halide formed. In this method, the selected solvents participate by progressive alcoholysis of the esters formed in an intermediate stage. Among the solvents having the required properties are propylene glycol, dipropylene glycol, diethylene glycol, ethylene glycol, hexylene glycol, 2-butoxy-ethanol, 1,3-butanediol and ethers of diethylene glycol, such as diethylene glycol monomethyl ether, diethylene glycol monoethyl ether, diethylene glycol diethylether, diethylene glycol monobutyl ether, diethylene glycol dibutyl ether, the boiling points of which are sufficiently high to make it unnecessary to use an autoclave. In general, it has been found that the amount of solvent to be used should equal at least 50 percent by weight of the amount of polyhalogenated ether which is to be hydroxylated, and preferably from 100 to 400 percent by weight.

The hydroxylation reaction is carried out at a temperature high enough for the speed of the reaction to be convenient and low enough so that there is no degradation of the products formed. A temperature between 150° and 200°C, and preferably between 180° and 190°C is suitable. The percentage of hydroxylation resulting under these conditions is always greater than 90 percent.

The alkaline salt of carboxylic acid used in the hydroxylation step is advantageously an acetate in stoichiometric proportions or in slight excess, (10 to 15 percent at the maximum) with respect to the halogenated compounds participating in the reaction. It has been found that the results remain equally satisfactory when the acetates are added all at once at the beginning of the hydroxylation step, or in successive fractions in the course of this reaction. It is possible to regenerate the acetates in situ from the esters formed during the reaction, for example, by adding an aqueous solution of an alkaline hydroxide and instantaneously evaporating the water.

Finally, in order to avoid coloring the products obtained during the hydroxylation, it has been found that it suffices to add reducing agents such as sodium hypophosphite or alkaline borohydrides.

The products according to formula (III) are very valuable because of their emulsifying properties and their compatability with ionic surface-active agents. This compatability makes it possible to introduce them into aqueous or hydroalcoholic solutions in association with ionic surface-active agents.

It is a further object of the present invention to provide cosmetic compositions, and particularly hair dye compositions, which are essentially characterized by the fact that they contain at least one product corresponding to formula (III) or to formula (I) in amounts ranging from 1 to 60 percent by weight of said composition and a conventional hair dye in amounts effective to color said hair.

These hair dye compositions may in addition contain other surface active agents and/or carriers, thickening agents such as hydroxyethylcellulose, carboxymethylcellulose etc.

It is another object of the present invention to provide an effective peptizing agent comprising said surface-active agents for dispersing solid pulverulent material in non-aqueous liquid media, and particularly in oils.

Still another object of the present application is to provide a dispersion of solid pulverulent material in non-aqueous liquid media, and particularly in oils, said dispersion being characterized by the fact that it contains as a peptizing agent at least one compound according to formula (III). Preferably R in this formula (III) represents a radical derived from alcohols and sterols obtained by hydrogenation of lanolin. R may also represent a radical derived from alcohols obtained by reduction of cyclic fatty acids.

A solid pulverulent material such as a pigment which is ground up in oil is frequently used in the cosmetic field. These pigments are often obtained by precipitation, and are dried. After drying they re-agglomerate, so that they must be ground before being mixed with the oil. This grinding is not too fine because it is limited by the mechanical means available. It has been suggested that the precipitated product be dried in the presence of oil. However, experience has shown that, even though insoluble in water, a large part of the pigment is not emulsified by the oil and re-agglomerates on drying. It has now been found that drying of such pigments in the presence of a peptizing agent according to the invention comprising a compound according to the formula (III) redisperses the pigments in the oil while retaining their original degree of fineness. Representative oils employed include, for instance, paraffin oil, vegetal oils, animal oils, modified animal oils such as perhydrosqualene or fatty acid esters such as isopropyl myristate.

Generally, the amount of oil employed ranges between about 50 to 99 percent based on the total weight of the dispersion and the amount of peptizing agent can vary between about 1 to 25 percent, based on the weight of the pulverulent material.

Moreover, it should be emphasized that the compounds of formula I in a 5 percent aqueous solution are completely harmless and freely tolerated by the mucous membrane of the eye. This property has been clearly established by tests carried out on the eyes of a group of rabbits using the methods described by J. H. Draize, G. Woodard and H. O. Calvery in the "Journal of Pharmacology" 1944, Vol. 82, pages 377–389 and by J. H. Draize and E. A. Kelly in "Proceedings of Scientific Section", 17, 1–4, (1952). No lesions of any nature appeared in the mucous membranes of the eyes of rabbits after such tests. Moreover, these compounds, when associated with cationic surface-active agents, cause no synergistic irritation. On the contrary, they decrease the irritation caused by certain quaternary ammonium halides.

The cosmetic compositions according to the invention may be stock solutions i.e. concentrates to be diluted before use and compositions ready for use.

The concentrates may contain up to 75 percent of the compounds of formulas I and III. The compositions ready for use are preferably aqueous solutions comprising about 1–25 percent and advantageously 5–20 percent of the compounds of formulas I and III.

The above cosmetic compositions may contain other ionic or non-ionic surface-active agents and the percentages indicated above include all the surface-active agents.

Other conventional additives such as thickening agents may be added to these compositions. When the hair is washed with these solutions it becomes shiny, soft and non-electric.

It has moreover been found that the compounds according to formula I may be used in cosmetic compositions as carriers for hair dyes. In general, such hair dye compositions have a pH of 3 to 9.

In order that the invention may be clearly illustrated, examples which show the general method of preparation and use of compounds of this invention will now be described.

EXAMPLE 1

Preparation of the compound

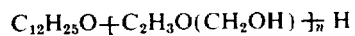

in which $n$ has a statistical average value of about 4.

First step-polycondensation 186 g of lauryl alcohol and 1.5 ml of an acetic compound of boron fluoride containing 36 percent $BF_3$ are introduced into a flask adapted to hold a liter and provided with stirring means, a thermometer and a cooling coil.

The mixture is heated to 75°C and 389 g of glycerol epichlorohydrin are added drop by drop. The reaction is exothermic, and the temperature stays between 75° and 80°C. The operation lasts 75 minutes, after which the reaction mixture is permitted to return to room temperature.

The resulting polyoxychloropropylenated lauryl alcohol is a clear yellow oil which is insoluble in water. The epoxide function is measured to verify that the epichlorohydrin has completely reacted.

Second step-hydroxylation 144 g of potassium acetate are dissolved in 360 g of dipropylene glycol. This solution is heated to 180°C under a nitrogen atmosphere.

181 g of the product obtained in the first step are added while stirring. This takes 30 minutes. The mixture is then heated for 2½ hours at between 180° and 190°C. After cooling it to room temperature, the potassium chloride formed is separated by filtration, with a yield of about 96 percent of the quantity which should theoretically have been formed.

The partially acetylated dipropylene glycol is evaporated under vacuum from the filtrate and a sirupy product soluble in water is thus isolated.

The index of saponification determined for both the end product and the recovered solvent, shows that the polyhydroxylated polyether is 85 percent de-acetylated.

The product is then dissolved in 500 ml of absolute ethyl alcohol. This solution is colored with vegetable black and 300 mg of sodium ethylate dissolved in 10 ml of absolute ethyl alcohol are added. The resulting mixture is left at room temperature for 6 hours, which permits de-acetylation of the product. After evaportion of the ethyl acetate and the ethyl alcohol, 147 g of an end product having the following characteristics are recovered:

| | |
|---|---|
| Saponification index | 0 |
| Hydroxyl index | 546 |
| Iodine index | 1 |
| Percentage of potassium acetate | 7% |

This compound is in the form of a sirupy liquid which is readily soluble in water. It has excellent foaming characteristics and is perfectly tolerated by the mucous membranes of the eye.

EXAMPLE 2

Preparation of the compound having the formula

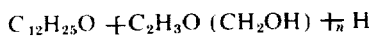

$C_{12}H_{25}O + C_2H_3O (CH_2OH) + _n H$ in which $n$ has a statistical average value of about 4.

In a first step the glycerol epichlorohydrin is polycondensed on the lauryl alcohol in the manner described in Example 1.

In the second step, hydroxylation is effected in the following manner:

0.84 mols of crystallized sodium acetate in the form of the trihydrate and 0.11 g of sodium hypophosphite are dissolved in 115 g of diethylene glycol. The solution is heated under a nitrogen atmosphere. When the temperature reaches 120°C the water begins to distill away. At 140°-145°C gelification may be seen.

115 g of polyoxychloropropylene lauryl alcohol are then added within 20 minutes, while stirring and maintaining the temperature between 140° and 145°C. The reaction mixture again becomes fluid, and is heated at 180°C to complete the evaporation of the water.

The reaction is then continued at 180°-185°C for 3 hours. Under these conditions from 95.5 to 96 percent of the sodium acetate involved is consumed. After cooling to 80°C, the solution is filtered and the sodium chloride washed with 29 g of diethylene glycol at 80°C.

The diethylene glycol is evaporated from the filtrate under vacuum and while heating to 180°C. 107 g of a product having a saponification index of 64 and 150 g of partially acetylated diethylene glycol having a saponification index of 244 are recovered.

The de-acetylation of the polyhydroxypolyether is terminated by saponification with aqueous 13 percent sodium hydroxide at a temperature of 40°-45°C. This step takes an hour and a half.

EXAMPLE 3

Preparation of the compound $RO + C_2H_3O (CH_2OH) + _n H$ (in which R represents a linear aliphatic chain having 12 to 14 carbon atoms derived from copra and $n$ has a statistical average value of 4).

First step-polycondensation

Proceeding as in Example 1, 370 g of glycerol epichlorohydrin are reacted with 200 g of a mixture of fatty alcohols of copra consisting essentially of dodecanol and tetradecanol in the proportion of about 70 percent of the first to 30 percent of the second. This produces a polychlorinated polyether.

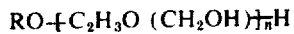

Second step-hydroxylation 114 g of the compound thus obtained are dissolved in 200 g of dipropylene glycol. The solution is heated to 180°C and 80 g of potassium acetate are added little by little. After 4 hours and 30 minutes of reaction at 180°C, 96 to 97 percent of the acetate introduced has been consumed. The potassium chloride thus formed is separated, the solvent is evaporated, and an indicated in Example 1, the product is dissolved in ethyl alcohol. The ethyl acetate and the ethyl alcohol are then eliminated and 100.5 g of a sirupy product are recovered. This product is soluble in water and corresponds to the formula given at the beginning of this example.

EXAMPLE 4

Preparation of the compound having the formula

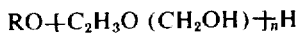

$RO + C_2H_3O (CH_2OH) + _n H$ (in which R represents a liner aliphatic chain having 12 to 14 carbon atoms, and $n$ has a statistical average value of about 5.5.)

First step-polycondensation

In the same way described in Example 1, 509 g of glycerol epichlorohydrin are reacted with 194 g of a mixture of fatty alcohols containing about 70 percent of dodecanol and 30 percent of tetradecanol in the presence of 1.5 ml of an acetic compound of boron fluoride comprising 36 percent $BF_3$.

This yields a chlorinated polyether.

Second step-hydroxylation 70 g of the polychlorinated polyether obtained in the first step hereinbefore described are dissolved in 735 g of 2-butoxy ethanol. The solution is heated to 170°C, and 55 g of anhydrous potassium acetate are then introduced little by little, over a period of 40 minutes.

After reacting for 7 hours at 170°C, the reaction mixture is permitted to return to ambient temperature. 94 percent of the quantity of potassium chloride which should theoretically have been formed is separated by filtration. After evaporation of the solvent 67.5 g of a product are recovered, which is then de-acetylated with ethanol, in the presence of potassium hydroxide which acts as a catalyst. The ethyl alcohol and ethyl acetate are then eliminated.

The resulting polyhydroxyl ether is soluble in water and is a good foaming detergent.

EXAMPLE 5

Preparation of the compound:

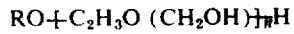

$RO + C_2H_3O (CH_2OH) + _n H$ (in which R is an alkyl radical having 16 to 18 carbon atoms and $n$ has a statistical average value of 6.)

First step-polycondensation

The method of operation is essentially that of Example 1. 416 g of glycerol epichlorohydrin ae reacted at a temperature between 70° and 80°C with 188 g of a mixture of cetyl alcohol and stearyl alcohol in the presence of 0.87 percent of boron fluoride, yielding a polychlorinated polyether.

Second step-hydroxylation 156 g of the compound thus obtained are mixed with 144.5 g of potassium acetate dissolved in hexylene glycol at a temperature between 180° and 195°C. The temperature is maintained for 3 hours. Then it is cooled to 25°C and the potassium chloride formed is separated by filtration. The hexylene glycol is then evaporated under a pressure of 15-20 mm of mercury while progressively increasing the temperature to 180°C. The product is de-acetylated by ethanolysis with sodium ethylate as the catalyst. The ethyl acetate and the alcohol are eliminated, and 132 g of a pasty product which dissolves in water at 75°C are recovered.

EXAMPLE 6

Preparation of the compound

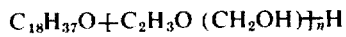
$C_{18}H_{37}O+C_2H_3O\ (CH_2OH)_{\overline{n}}H$ in which $n$ has a statistical average value of 10.

First step-polycondensation

In the same general way as in Example 1, 462.5 g of glycerol epichlorohydrin are reacted with 143.5 g of stearyl alcohol in the presence of 1.1 percent boron fluoride. The reaction mixture is kept for four hours at a temperature between 60° and 65°C and then heated to 120°C for 5 minutes. It is then stirred while being permitted to return to ambient temperature.

The result is a polychlorinated polyether.

Second step-hydroxylation 242.5g of the compound obtained in the first step are heated with 200 g of potassium acetate, using 300 g of dipropylene glycol as the solvent. The reaction is continued for 3 hours at a temperature between 185° and 190°C. The chloride ion and the potassium acetate are then measured to determine the percentage of transformation, which is found to be between 97 and 98 percent. The resulting product is isolated and ethanolyzed as in Example 1. After the ethyl alcohol and ethyl acetate have been evaporated, the process yields 177 g of a solid product which, in aqueous solution, is slightly opalescent at 25°C and limpid at 60°C.

EXAMPLE 7

Preparation of the compound $RO+C_2H_3O\ (CH_2OH)_{\overline{n}}H$ (in which $n$ has statistical average value of 5 and R is a branched chain alkyl radical containing 11 to 16 carbon atoms in the branch chain derived from an alcohol obtained by "Oxo" synthesis).

First step-polycondensation

Using the method of Example 1, 231.2 g of glycerol epichlorohydrin are reacted with 105.5 g of a mixture of fatty alcohols obtained by "Oxo" synthesis, the branched hydrocarbon chain of which contains 11 to 16 carbon atoms. This reaction is carried out in the presence of 0.75 ml of an acetic compound of boron fluoride.

This yields of polyoxychloropropylenated alcohol which is insoluble in water and a deep brown in color.

Second step-hydroxylation 134.7 g of the compound thus obtained are dissolved in 876 g of dipropylene glycol, and 1 g of potassium borohydride is added to this solution. The mixture is heated while stirring and loses color rapidly. 100 g of potassium acetate are then added, followed by 50 g of dipropylene glycol. After 3 hours of reaction at 175°-180°C, 93.5% of the potassium acetate supplied has been consumed.

The potassium chloride is separated by filtration, after which the solvent is evaporated by progressively raising the temperature to 180°C under a reduced pressure (15 to 20 mm of mercury). The resulting product is then subjected to ethanolysis in the presence of alcoholic potassium hydroxide.

The ethyl acetate and alcohol are then eliminated and 135.5 g of a sirupy liquid are recovered. This liquid dissolves easily in water and may be used as a foaming detergent.

EXAMPLE 8

First step-polycondensation

Glycerol epichlorohydrin is reacted with commercial oleyl alcohol having a hydroxyl index of 207 and an iodine index of 88.

This yields polychlorinated mono-alkyl-ethers having the formula:

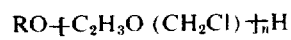
$RO+C_2H_3O\ (CH_2Cl)_{\overline{n}}H$ in which R designates the radical derived from the oleyl alcohol raw material and $n$ has the value 2, 4, 5 or 6.

This reaction is carried out at about 60°C, using, as a catalyst, an acetic compound of boron fluoride in the ratio of about 0.25 ml per 100 g of reaction mass.

Second step-hydroxylation

The polychlorinated ether obtained in the first step of the present example is treated with a stoichiometric quantity of potassium acetate at a temperature of about 180°-185°C, for 5 hours. The solvent used in this reaction is dipropylene glycol. The quantity of solvent is equal in weight to that of the chlorinated ether and the potassium acetate combined.

The products obtained at the end of the hydroxylation step have properties which are summarized in the following table:

| Value of n | Appearance | Solubility |
|---|---|---|
| 2 | Yellow oil | Dispersible in water |
| 4 | Yellowish paste | Soluble in water with turbidity |
| 5 | Clear brown paste | Soluble in a hydroalcoholic medium containing 10% alcohol |
| 6 | Clear brown paste | Soluble in water |

EXAMPLE 9

First step-polycondensation 343 g of "Hexadecylic" alcohol, sold commercially by Esso, are reacted with 180 g of glycerol epichlorohydrin in the presence of 1.25 ml of an acetic compound of boron fluoride, yielding a polychlorinated ether having the formula:

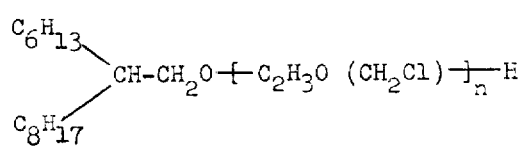

in which $n$ has a statistical average of 1.5.

Second step-hydroxylation

This polychlorinated ether is treated with a quantity of potassium acetate 5 percent in excess of the stoichiometric quantity. After reacting for 5 hours at 180°C, the resulting salt is filtered and the dipropylene glycol which was used as solvent is evaporated off.

The crude product is then saponified with aqueous sodium hydroxide at 48 percent by weight, washed in boiling water to eliminate the electrolytes, and dried, to yield the hexadecylic monoether having the formula:

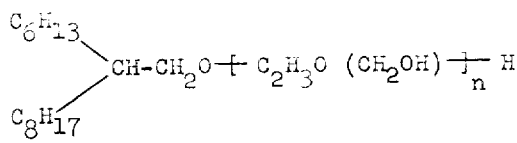

in which $n$ has a statistical average value of 1.5 and is an almost colorless oil which is dispersible in water. The product can advantageously replace the oleic derivative having the same hydrophilic chain. Because it contains no double bond, it does not turn rancid.

EXAMPLE 10

First step-polycondensation 372 g of lauryl alcohol (i.e., the product sold under the trademark "Alfol-12") are reacted at 85°–90°C with 278.5 g of glycerol epichlorohydrin in the presence of 1.65ml of an acetic compound of boron fluoride.

The result is a lauryl ether having the formula:

$$C_{12}H_{25}O + C_2H_3O\ (CH_2Cl)_{\overline{n}}H$$

in which $n$ has a statistical average value of 1.5.

Second step-hydroxylation 162 g of polychlorinated ether prepared in the first step are treated with 74 g of potassium acetate in 200 g of 2-butoxy ethanol at 170°C for 3½ hours. The raw product obtained is then saponified with 95 g of 30 percent sodium hydroxide at a temperature of 50°–60°C. 205 ml of water are then added to the reaction mixture. The aqueous phase containing the electrolytes is then separated by decanting. The organic phase is twice washed with an aqueous solution of 15 percent sodium sulfate, which has first been heated to 70°C.

Third step-preparation of a sulfated derivative 74 g of polyhydroxylated ether prepared in the first step are mixed with 6 g of urea and heated to 90°C. 25 g of sulfamic acid are then added. The mixture is vigorously mixed using a turbo-mixer and heated on an oil bath to 120°C. The reaction is then strongly exothermic and, while heating is discontinued, the temperature rises to 140°C.

The resulting sulfate dissolves readily in water and is a good foaming detergent.

EXAMPLE 11

Preparation of the compound

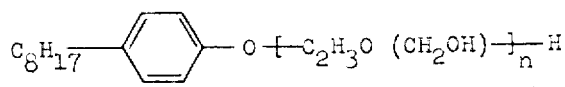

in which $n$ has a statistical average value of about 6.

First step-polycondensation 2.5 ml of a phenolic boron fluoride compound containing 26 percent $BF_3$ are added to 167 grams of melted octylphenol. 416 grams of glycerol epichlorohydrin are then added, drop by drop, while stirring. The reaction begins at 95°C, after which the temperature is lowered to 75°–80°C when the mixture will remain liquid at the latter temperature.

The epichlorohydrin is added over a period of 60 minutes. 0.5 ml of the phenolic boron fluoride compound is then added and the reaction terminated while continuing to stir the mixture.

No loss of weight due to evaporation of volatile products occurs while the mixture is being heated in a waterbath under a vacuum produced by a water-jet pump. The polychlorinated ether thus obtained is in the form of a viscous oil.

Second step-hydroxylation 300 g of potassium acetate are dissolved in 700 g of dipropyleneglycol and the resulting solution heated to 180°C under a nitrogen atmosphere.

398 g of the product obtained in the first step are then added while stirring the mixture of 170 minutes, after which it is heated for 100 minutes at a temperature between 180°C and 190°C. It is then cooled to room temperature and the potassium chloride formed therein is filtered out.

The partially acetylated dipropylene glycol is evaporated under vacuum from the filtrate.

The product thus obtained is dissolved in 750 ml of absolute ethyl alcohol; the solution is colored with vegetable black, and 30 ml of alcoholic potassium hydroxide at half normal strength are added. The resulting mixture is left at room temperature for 4 hours and 30 minutes, thus de-acetylating the product. After evaporation of the ethyl acetate and the alcohol 335 g of a product corresponding to the formula at the beginning of this example are obtained in the form of a viscous substance which is soluble in water. This substance has good foaming power and does not irritate the mucous membrane of the eye.

EXAMPLE 12

Preparation of the compound

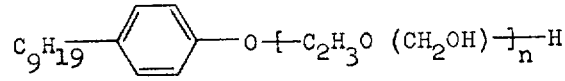

in which $n$ has a statistical average value of 6.

First step-polycondensation

Following the method described in Example 1, 416 g of glycerol epichlorohydrin are reacted with 172 g of commercial nonyl-phenol. A polychlorinated polyether is thus obtained.

Second step-hydroxylation 300 g of potassium acetate are dissolved in 700 g of dipropylene glycol. The solution is heated to 180°C. and 392 g of the product obtained in the first step are added, little by little. After reacting for 4 hours at 180°C, about 95 percent of the theoretical quantity of potassium chloride has been formed and should then be separated out. The solvent is then evaporated and the ethyl acetate and alcohol eliminated, to yield 345 g of a viscous product which is soluble in water and corresponds to the formula given at the beginning of this example.

EXAMPLE 13

Preparation of the product represented by the formula $RO+C_2H_3O(CH_2OH)_{\overline{n}}H$ in which R is a hydrocarbon derived from lanolin alcohol obtained by catalytic hydrogenation of lanolin and sold under the trademark "ELROLAN" by the VEB DEUTSCHES HYDRIERWERK, and $n$ has a statistical average value of 4.

First step-polycondensation 0.7 ml of an acetic complex of boron fluoride is added to 103 g (25 percent of the molecularly equivalent amount of alcohol) in the form of the above "ELROLAN" which has been melted.

The mixture is heated to 75°–80°C, and 92.5 g of glycerol epichlorohydrin are introduced, while stirring. This addition is so regulated as to keep the temperature substantially constant, as a result of the exothermic character of the reaction.

This operation takes 40 minutes. The reaction mixture is then heated in a water bath for 15 minutes.

The result is a polychlorinated ether in the form of a viscous oil.

Second step-hydroxylation 156.6 g of polychlorinated ether are dissolved in 160 g of dipropylene glycol. The mixture is heated to 145°C. 260 g of a 30 percent aqueous solution of potassium acetate are then introduced. In the course of this operation the temperature is progressively increased so as to eliminate water from the reaction mixture. This is then maintained at 180°–185°C. under a nitrogen atmosphere for 3 hours.

After cooling, the potassium chloride is separated by filtration. The precipitated salt is washed with hot dipropylene glycol. The solvent is evaporated from the filtrate at first under a reduced pressure of 15–20 mm of mercury, and then udner a pressure of 1 mm.

The product is then introduced into 225 ml of absolute ethyl alcohol and subjected to ethanolysis. For this purpose sodium methylate is used as a catalyst in the proportion of 0.275 g per 100 g of product to be treated.

The mixture is kept first at 35°C so as to obtain a homogeneous mixture, and then left at room temperature overnight. After evaporation of the ethyl acetate and ethyl alcohol, a yellow-brown paste is recovered which can be dispersed in water. The composition of this paste is represented by the formula given at the beginning of the example, and it has the following characteristics:

| | |
|---|---|
| Hydroxyl index | 372 |
| Saponification index | 9 |

EXAMPLE 14

Preparation of the product represented by the formula $$RO+C_2H_3O(CH_2OH)_{\overline{n}}H$$

in which $n$ has a statistical average value of 7.6 and R represents the alkyl radical of the mixture of hydrogenated lanolin alcohols sold commercially under the trademark "ELROLAN".

First step-polycondensation of epichlorohydrin

In this process 41.3 g of the mixture of lanolin alcohols, 74 g of glycerol epichlorohydrin and 0.4 ml of an acetic complex of boron fluoride are reacted together, the acetic complex of boron fluoride being introduced into the reaction mixture in three fractions:

0.2 ml at the beginning of the reaction;

0.1 ml before the end of the addition of the first half of the epichlorohydrin used; and 0.1 ml while the second half of the epichlorohydrin is being introduced The temperature is kept at 80°–85°C.

Under these conditions 93 percent of the epoxide introduced is consumed, i.e., 7.6 mols per molar equivalent of alcohol.

after evaporation of the glycerol epichlorohydrin the result is a polychlorinated ether represented by the formula:

$$RO+C_2H_3O(CH_2Cl)_{\overline{n}}H$$

in which R and $n$ have the significance hereinbefore assigned thereto.

Second step-hydroxylation

This step is carried out at 180°–185°C in a propylene glycol bath, utilizing potassium acetate in stoichiometric proportions with respect to the chlorine.

After 4 hours of heating at 180°–185°C, the percentage of substitution is of the order of 96 percent.

After separating the potassium chloride by filtration, the dipropylene glycol is evaporated under subatmospheric pressure.

As in Example 1, the de-acetylation is terminated by ethanolysis.

The resulting product is dissolved in water. The solution this produced exhibits a turbidity which does not increase when the temperature is raised to 100°C.

EXAMPLE 15

Preparation of the product represented by the formula $$RO+C_2H_3O(CH_2OH)_{\overline{n}}H$$

in which R represents the alkyl radical of the hydrogenated lanolin alcohols sold commercially under the trademark "HYDROLAN" by OCCO INTERNATIONAL (DIVISION OF MILLMASTER ONYX CORPORATION). This raw material has a hydroxyl index of 154.

The polycondensation of epichlorohydrin and the hydroxylation reaction are carried out under conditions identical to those described in Example 13. The product thus obtained is in the form of a soft water insoluble wax.

EXAMPLE 16

Preparation of the product represented by the formula $$RO+C_2H_3O(CH_2OH)_{\overline{n}}H$$

in which R represents the alkyl of the lanolin alcohols sold under the trademark "HYDROLAN".

The polycondensation of the epichlorohydrin is carried out at 80°-90°C in the presence of boron fluoride as a catalyst and in the proportion of 0.15 percent of the total weight of the reaction mixture. Hydroxylation is brought about by heating at 180°C for 4 hours and a half.

The polyhydroxyl polyether represented by the above formula takes the form of a yellow-brown paste. It is dispersible in water.

EXAMPLE 17

Preparation of the product represented by the formula

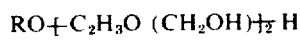

in which R represents a hydrocarbon derived from alcohols obtained from the isostearic acid sold commercially by the Emery Company, the preparation of which is described in U.S. Pat. No. 2,812,342.

The mixture of fatty alcohols obtained by catalytic hydrogenation and distillation has a hydroxyl index of 193.

First step-polycondensation of epichlorohydrin

By reacting 245 g of isosterarylic acid at 80°C with 148 g of epichlorohydrin, in the presence of 1.2 ml of an acetic complex of $BF_3$, a polychlorinated ether is obtained which responds to the formula:

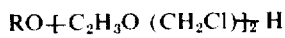

Second step-hydroxylation 385 g of the polychlorinated ether obtained in the first step are dissolved in 580 g of propylene glycol. The mixture is heated to 140°C and 420 g of an aqueous 40.4 percent solution of potassium acetate are introduced by progressively increasing the temperature to 165°C so as to eliminate the water from the reaction mixture.

After four and a half hours at 180°-190°C, the percentage of substitution, calculated from the acetate consumption, is 99 percent.

The potassium chloride is then separated and the dipropylene glycol evaporated under vacuum. The diacetylation of the product is then terminated by ethanolysis, using 0.25% sodium methylate as the catalyst.

After evaporation of the ethyl acetate and ethyl alcohol, a polyhydroxyl polyether is recovered in the form of a sirupy light yellow liquid.

This product is purified by washing it twice in boiling water, using one liter of water in the first washing and 1.5 liters in the second.

The products represented by the following formula are successively prepared in like manner.

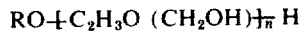

In this formula R represents a hydrocarbon derived from alcohols obtained by the catalytic hydrogenation of commercial isostearic acid. The properties of these derivatives are summarized in the following table:

| n | Appearance | Solubility |
|---|---|---|
| 3 | Very viscous liquid | Insoluble in water Soluble in vaseline oil |
| 6 | Paste | Dispersible in water Soluble in vaseline oil |
| 9 | Solid brown orange | Soluble in water Insoluble in vaseline oil |

Although the example set forth above can use R groups obtained by reacting commercially available fatty alcohol mixtures, similar results are obtained by using a single fatty alcohol, aliphatic alcohol or alicyclic alcohol. When a single or pure ROH reactant is used the R portion of the compounds formed all have that R group.

The following alcohols further illustrate the type alcohols that can be substituted in the above examples to produce the compounds of this invention which have the corresponding R and $R_1$ groups present in the specific alcohol reactant:

a. Saturated linear alcohols such as:
  1-octanol
  1-decanol
  1-undecanol
  1dodecanol
  1-tridecanol
  1-tetradecanol
  1-pentadecanol
  1-hexadecanol
  1-heptadecanol
  1-octadecanol
  1-eicosanol
  1-docosanol
b. Unsaturated linear alcohols such as:
  Oleyl alcohols (cis-9-octadecene-1-ol)
  Elaidyl alcohol (trans-9-octadecene-1-ol)
  Erucylic alcohol (cis-13-docosene-1-ol)
c. Branched chain alcohols such as:
  2-ethyl-1-hexanol
  2-methyl-1-decanol
  2-methyl-1-dodecanol
  2-methyl-1-tridecanol
  2-methyl-1-tetradecanol
  3,7, 11, 15-tetramethyl-1-hexadecanol
  2, 3, 5, 7-tetramethyl-1-nonanol
  2, 4, 7-trimethyl-1-nonanol
  2-octyl-1-dodecanol
  2-hexyl-1-decanol
  2-methyl-alkanols
d. Fatty alcohols derived from animal and vegetable oils and fats, such as:
  Copra
  Tallow, etc.
e. Mixed industrial alcohols such as those derived from the "ALFOL" process, the "OXO" process, etc. These compositions contain a variety of isomers and homologs which vary with the olefin feed that is being converted to the alcohol mixture.
f. Fatty alcohols prepared using the GUERBET reaction.
g. Fatty alcohols prepared using the method described in U.S. Pat. 2,812,342.
h. Phenol alkyls, such as:
  p-tert-octyl-phenol
  p-sec-octyl-phenol
  p-isononyl-phenol
  p-tert-dodecyl-phenol
  p-isododecyl-phenol
and in general those alcohols which are obtained by alkylation of phenols with olefins such as dodecine, tripropylene, tetrapropylene and diisobutylene.
i. Aliphatic alcohols, such as:
  ceryl alcohol
  melissyl alcohol
  cholesterol lanesterol or dihydrolanesterol mixtures obtained by catalytic hydrogenation of lanolin or resinic fatty acids.

The preparation of lanolin alcohols by hydrogenation was described by K. Stickdorn — E. Konig and Birk in the TENSIDE review, 3, No. 2 (1966) p.45.

j. Saturated cyclic fatty alcohols such as:

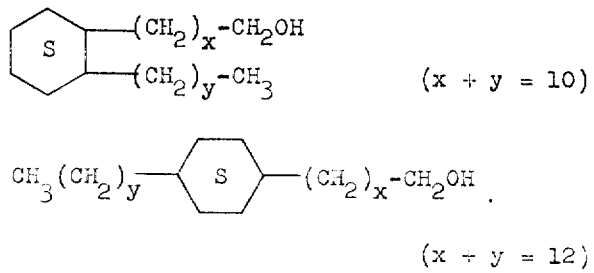

These cyclic alcohols have been described by Bellfriedrich Gast and Cowan in JAOCS review, 42, October 1965, on page 876.

Moreover, the compounds of the invention can be transformed by a known process, into ionic surface-active agents by introducing ionic groups into the compound structure, such as sulfonate ions, carboxylate ions, phosphate ions, etc.

EXAMPLE 18

The following composition is prepared:

| | | |
|---|---|---|
| RO-[C$_2$H$_3$O(CH$_2$OH)]$_{\overline{n}}$ H in which R is an oleyl radical | 35 | g |
| RO-[C$_2$H$_3$O(CH$_2$OH)]$_{\overline{n}}$ H in which R is an oleyl radical | 20 | g |
| 2-butoxy ethanol | 15 | g |
| 20% ammonia | 13 | cm$^3$ |
| Ethylene diamine tetracetic acid | 0.3 | g |
| Sodium bisulfite | 0.6 | g |
| Paratoluylene diamine | 0.4 | cm$^3$ |
| Metadiamino-anisol | 0.04 | g |
| Resorcine | 0.2 | g |
| Meta-aminophenol | 0.10 | g |
| Para-aminophenol | 0.25 | g |
| Water, q.s.p. | 100 | g |

This solution is mixed with an equal volume of hydrogen peroxide at 20 volumes, thus producing a beautiful transparent gel. This gel is applied to very gray hair for 25 minutes. After shampooing, a chestnut shade results.

When dried, the hair is especially soft and lustrous.

EXAMPLE 19

The following composition is prepared:

| | | |
|---|---|---|
| RO-[C$_2$H$_3$O(CH$_2$OH)]$_{\overline{n}}$ H in which R is an oleyl radical | 25 | g |
| RO-[C$_2$H$_3$O(CH$_2$OH)]$_{\overline{n}}$ H in which R is an oleyl radical | 15 | g |
| Olein | 6 | g |
| 50% dicetyldimethyl ammonium chloride in isopropanol | 12 | g |
| 2-butoxy ethanol | 10 | g |
| Ethyl alcohol | 8 | g |
| 20% ammonia | 11 | cm$^3$ |
| Paratoluylene diamine | 0.4 | g |
| Resorcine | 0.15 | g |
| Meta-aminophenol | 0.1 | g |
| Para-aminophenol | 0.7 | g |
| Methyl para-aminophenol | 0.3 | g |
| Meta-diaminoanisol | 0.02 | g |
| Ethylene diamine tetracetic acid | 0.3 | g |
| Sodium bisulfite | 0.6 | g |
| Water, q.s.p. | 100 | g |

This solution is mixed with its own volume of hydrogen peroxide at 20 volumes. When applied to very gray hair for 25 to 30 minutes, the result, after shampooing, is a golden chestnut shade.

The hair, after treatment, is very soft and easy to manage.

EXAMPLE 20

The following composition is prepared:

| | | |
|---|---|---|
| RO-[C$_2$H$_3$O (CH$_2$OH)]$_2$-H R = oleyl | 30 | g |
| RO-[C$_2$H$_3$O (CH$_2$OH)]$_4$-H R = oleyl | 15 | g |
| Trimethylcetylammonium bromide | 5 | g |
| 2-Butoxyethanol | 8 | g |
| Ethyl alcohol | 12 | g |
| 20% ammonia | 12 | cm$^3$ |
| Ethylene diamine tetracetic acid | 0.3 | g |
| Paratoluylene diamine | 0.35 | g |
| Metadiamino-anisol | 0.02 | g |
| Resorcine | 0.15 | g |
| Meta-aminophenol | 0.3 | g |
| Para-aminophenol | 0.2 | g |
| Sodium bisulfite | 0.6 | g |
| Water q.s.p. | 100 | g |

This solution is mixed with its own volume of hydrogen peroxide at 20 volumes. When applied to very gray hair for 25 to 30 minutes, the result, after shampooing, is a dark blond shade.

The hair, after treatment, is very soft and easy to manage.

EXAMPLE 20 A

The same composition is prepared as in example 20 except that $$\begin{array}{c}C_6H_{13}\\ \phantom{C_6H_{13}}\diagdown\\ \phantom{xxxxxx}CH-CH_2O-[C_2H_3O(CH_2OH)]_{1.5} H \quad 30\ g\\ \phantom{xxxxxx}\diagup\\ C_8H_{17}\end{array}$$

is used instead of $$RO-[C_2H_3O(CH_2OH)]_2 H \quad 30\ g$$
$$R = oleyl$$

The same good results are obtained as in example 20.

EXAMPLE 21

The following composition is prepared:

| | | |
|---|---|---|
| RO-[(C$_2$H$_3$O (CH$_2$OH)]$_2$-H R = oleyl | 20 | g |
| RO-[C$_2$H$_3$O (CH$_2$OH)]$_4$ H R = C$_{12}$H$_{25}$ | 20 | g |
| Laurylether sodium sulfate oxyethylenated with 2 moles of ethylene oxide | 5 | g |
| Ethyl alcohol | 15 | g |
| 20% ammonia | 14 | cm$^3$ |
| Ethylene-diamine tetracetic acid | 0.3 | g |
| Para-toluylene-diamine | 0.1 | g |
| Resorcine | 0.1 | g |
| Meta-aminophenol | 0.05 | g |
| Para-aminophenol | 0.15 | g |
| Sodium bisulfite | 0.6 | g |
| Water q.s.p. | 100 | g |

This solution is mixed with its own volume of hydrogen peroxide at 20 volumes. When applied to very gray hair for 25 to 30 minutes, the result, after shampooing, is a fair blond shade.

The hair, after treatment, is very soft and easy to manage.

EXAMPLE 21 A

The same composition is prepared as in example 21 except that

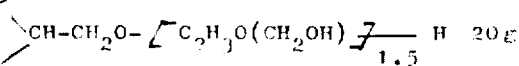
$$\begin{array}{c}C_6H_{13}\\ \phantom{C_8H_{17}}\diagdown\\ \phantom{xxx}CH-CH_2O-[C_2H_3O(CH_2OH)]_{\overline{1.5}}H \quad 20\ g\\ \diagup\\ C_8H_{17}\end{array}$$

is used instead of

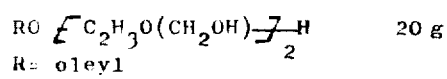
$$RO-[C_2H_3O(CH_2OH)]_{\overline{2}}H \quad 20\ g$$
$$R = \text{oleyl}$$

The same good results are obtained as in example 21.

EXAMPLES 21 B – 21 E

The same composition is prepared as in example 21 except that $$C_{12}H_{25}O-[C_2H_3O(CH_2OH)]_{\overline{4}}H \quad 20\ g$$

is replaced by the same weight of:

RO $-[C_2H_3O(CH_2OH)]_{\overline{4}}$H   (EXAMPLE 21 B)

in which R represents a linear aliphatic chain having 12 to 14 carbon atoms derived from copra.

RO $-[C_2H_3O(CH_2OH)]_{\overline{5.3}}$H   (EXAMPLE 21 C)

in which R represents a linear aliphatic chain having 12 to 14 carbon atoms derived from copra.

RO $-[C_2H_3O(CH_2OH)]_{\overline{5}}$H   (EXAMPLE 21 D)

in which R is a branched chain alkyl radical containing 11 to 16 carbon atoms.

RO $-[C_2H_3O(CH_2OH)]_{\overline{6}}$H   (EXAMPLE 21 E)

in which R is a radical derived from oleyl alcohol.

EXAMPLE 22

The following composition is prepared:

| | | |
|---|---:|---|
| R-O-[C₂H₃O (CH₂OH)]₄-H<br>R = C₁₂H₂₅ | 15 | g |
| R-O-[C₂H₃O(CH₂OH)]₂-H<br>R = Oleyl | 25 | g |
| Ethyl alcohol | 20 | g |
| 20% ammonia | 11 | cm³ |
| Ethylene-diamine tetracetic acid | 0.3 | g |
| Para-toluylene-diamine | 0.45 | g |
| Meta-diaminoanisol | 0.05 | g |
| Resorcine | 0.2 | g |
| Meta-aminophenol | 0.8 | g |
| Para-aminophenol | 0.5 | g |
| Sodium bisulfite | 0.6 | g |
| Water q.s.p. | 100 | g |

This solution is mixed with its own volume of hydrogen peroxide at 20 volumes. When applied to very gray hair for 25 to 30 minutes, the result, after shampooing, is a chestnut shade.

The hair, after treatment, is very soft and easy to manage.

EXAMPLE 22 A

The same composition is prepared as in example 22 except that the two first components are replaced by $$RO\ -[C_2H_3O(CH_2OH)]_{\overline{4}}H$$
$$15\ g$$

R= linear aliphatic chain having 12 to 14 carbon atoms derived from copra and

$$\begin{array}{c}C_6H_{13}\\ \diagdown\\ \phantom{xxx}CH-CH_2O-[C_2H_3O(CH_2OH)]_{\overline{1.5}}H \quad 25\ g\\ \diagup\\ C_8H_{17}\end{array}$$

The same good results are obtained as in example 22.

EXAMPLE 22 B

The same composition is prepared as in example 22 except that the two first components are replaced by $$RO\ -[C_2H_3O(CH_2OH)]_{\overline{4}}H$$
$$15\ g$$

R= linear aliphatic chain having 12 to 14 carbon atoms derived from copra and $$RO\ -[C_2H_3O(CH_2OH)]_{\overline{2}}H$$
$$25\ g$$

R= isostearyl

The same good results are obtained as in example 22.

EXAMPLE 23

The following composition is prepared:

Dyes

1,8-bis-γ-aminopropylamino anthraquinone ................... 0.15 g 1-diethylamino ethylamino-2-nitro-4-N,N-dihydroxy-ethylamino benzene dihydrochloride ....................... 0.6 g 4-N-methylamino-3-nitro-1-N-β-aminoethylamino benzene ...... 0.25 g

[1-hydroxy-4-(γ-methylmorpholinium) propyl-amino anthraquinone] methylsulfate ......................... 0.1 g 2-β-aminoethylamino anthraquinone .......................... 0.2 g 1,5-di-(β-aminopropylamino) anthraquinone .................. 0.3 g

EXAMPLE 23 — Continued

| | |
|---|---|
| 1-dimethylamino-3-aminoethylamino-4-nitro benzene | 0.3 g |
| 1-methylamino-4-amino-propylamino anthraquinone | 0.3 g |
| 1-amino-propylamino anthraquinone | 0.15 g |
| 1,4-diamino-5-aminopropylamino anthraquinone | 0.4 g |
| 3-nitro-4-β-aminoethylamino anisole monohydrochloride | 0.2 g |

Carrier

| | |
|---|---|
| Lauric acid | 1.00 g |
| Diethanolamide of copra | 1.00 g |
| Lauryl sodium sulfate oxyethylenated with 2 moles of ethylene oxide | 5.00 g |

$$R-NH-CH-COONa$$
$$\underset{CH_2}{|}-CON-(CH_2)_3-N\begin{array}{c}CH_2-CH_3\\CH_2-CH_3\end{array} \quad \ldots 1.00 \text{ g}$$

R = hydrocarbon radical derived from fatty acids of copra $$R - O-[C_2H_3O(CH_2OH)]_6-H \quad \ldots 5.00 \text{ g}$$

R = nonylphenyl

| | |
|---|---|
| Butylglycol | 6.00 g |
| Monoethanolamine | 0.60 g |
| Hydroxyethylcellulose sold by Union Carbide and Carbon under the trade mark "Cellosize W.P.3" | 15 g |
| Water q.s.p. | 100 g |

This composition is applied for 20 minutes to chestnut hair containing 30 percent to 70 percent gray hair. After shampooing a dark chestnut shade is obtained masking the gray hair.

EXAMPLE 24

The following composition is prepared :

Dyes

| | |
|---|---|
| 1,8-bis- γ aminopropylamino anthraquinone | 0.15 g |
| 1-diethylamino ethylamino-2-nitro-4-NN dihydroxyethylamino benzene dihydrochloride | 0.6 g |
| 4-N-methylamino-3-nitro-1-N-β-aminoethylamino benzene | 0.25 g |
| [1-hydroxy-4-(γ-methylmorpholinium) propylamino anthraquinone] methyl sulfate | 0.1 g |
| 2-β-aminoethylamino anthraquinone | 0.2 g |
| 1,5 di- (β-aminopropylamino) anthraquinone | 0.3 g |
| 1-dimethylamino-3-amino ethylamino-4-nitro benzene | 0.3 g |
| 1-methylamino-4-amino propylamino anthraquinone | 0.3 g |
| 1-amino propylamino anthraquinone | 0.15 g |
| 1,4-diamino-5-γ-aminopropylamino anthraquinone | 0.4 g |
| 3-nitro-4-β-aminoethylamino anisole monohydrochloride | 0.2 g |

Carrier

| | |
|---|---|
| Lauric acid | 1.00 g |
| Diethanolamide of copra | 1.00 g |

EXAMPLE 24—Continued

Lauryl sodium sulfate oxyethylenated with 2 moles of ethylene oxide..................................................5.00 g

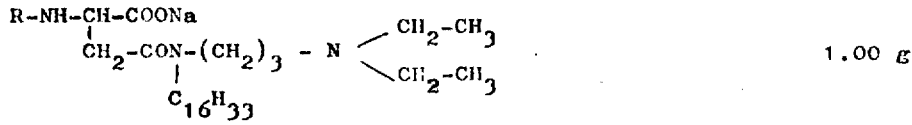

1.00 g

R : hydrocarbon radical derived from fatty acids of copra $R-O-[C_2H_3O(CH_2OH)]_6-H$ ..................................5.00 g R = octylphenyl Butylglycol..................................................6.00 g
Monoethanolamine.............................................0.60 g
Hydroxyethylcellulose, sold by Union Carbide and Carbon under the trade mark "Cellosize W.P. 3" ...................15.00 g
Water q.s.p. ...............................................100 g This composition is applied for 20 minutes to chestnut hair containing 30 percent to 70 percent gray hair.

After shampooing a dark chestnut shade is obtained masking the gray hair.

This solution is mixed with its own volume of hydrogen peroxide at 20 volumes. When applied to very gray hair for 25 to 30 minutes, the result, after shampooing, is a brown shade.

The hair, after treatment, is very soft and easy to manage.

EXAMPLE 25 aminohydroquinone............................................0.4 g
2,5-dihydroxy monomethylamino benzene........................0.7 g
6-hydroxy-5-methyl-2,4-diaminobenzene........................1.5 g
4-hydroxy-3-amino-anisole hydrochloride......................1.6 g
2,5-diamino-4-methyl phenol dihydrobromide...................0.5 g
4-NN-diethylamino-2,6-diaminophenol trichlorhydrate..........0.6 g
diethanolamide of copra......................................3.0 g

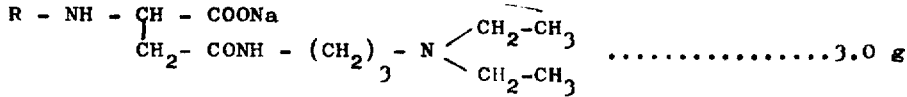

3.0 g

R : hydrocarbon derived from the fatty acids of copra $C_{12}H_{25}O-[C_2H_3O(CH_2OH)]_4-H$ .........................6.0 g Sodium bisulfite 33° Bé......................................1 cc
NaOH 5N q.s.p. ..........................................pH 7
Water q.s.p. ...............................................100 g

EXAMPLE 26

The same composition is prepared as in example 23 except that $$C_{12}H_{25}O + [C_2H_3O(CH_2OH)]_{11.5}H$$

1.00 g is used instead of diethanolamide of copra —1.00 g. The same good results are obtained as in example 23.

EXAMPLE 27

The same composition is prepared as in example 24 except that $$C_{12}H_{25}O + [C_2H_3O(CH_2OH)]_{11.5}H$$

1.00 g is used instead of diethanolamide of copra— 1.00 g. The same good results are obtained as in Example 24.

EXAMPLE 28

The same composition is prepared as in example 25 except that $$C_{12}H_{25}O + [C_2H_3O(CH_2OH)]_{11.5}H$$

3.00 g is used instead of diethanolamide of copra— 3.00 g. The same good results are obtained as in example 25.

EXAMPLE 29

The following composition is prepared :

Dyes

| | |
|---|---|
| 1,8-bis-γ-aminopropylamino anthraquinone | 0.15 g |
| 1-diethylamino ethylamino-2-nitro-4-NN-dihydroxyethylamino benzene dihydrochloride | 0.6 g |
| 4-N-methylamino-3-nitro-1-N-β-aminoethylamino benzene | 0.25 g |
| [1-hydroxy-4-(γ-methylmorpholinium) propylamino anthraquinone] methylsulfate | 0.1 g |
| 2-β-aminoethylamino anthraquinone | 0.2 g |
| 1,5-di-(β-aminopropylamino) anthraquinone | 0.3 g |
| 1-dimethylamino-3-aminoethylamino-4-nitro benzene | 0.3 g |
| 1-methylamino-4-amino-propylamino anthraquinone | 0.3 g |
| 1-amino-propylamino anthraquinone | 0.15 g |
| 1,4-diamino-5-aminopropylamino anthraquinone | 0.4 g |
| 3-nitro-4-β-aminoethylamino anisole monohydrochloride | 0.2 g |

Carrier

| | |
|---|---|
| Lauric acid | 1.00 g |
| Diethanolamide of copra | 1.00 g |
| Lauryl sodium sulfate oxyethylenated with 2 moles of ethylene oxide | 5.00 g |

R-NH-CH-COONa
 |
 CH$_2$-CON-(CH$_2$)$_3$ -N $\begin{array}{c} \diagup CH_2-CH_3 \\ \diagdown CH_2-CH_3 \end{array}$   1.00 g R = hydrocarbon radical derived from fatty acids of copra R-O—[C$_2$H$_3$O(CH$_2$OH)]$_6$—H   4.5 g
R = nonylphenyl R-O—[C$_2$H$_3$O(CH$_2$OH)]$_7$—H   0.5 g R = hydrocarbon radical derived from lanolin alcohols obtained by catalytic hydrogenation of lanolin.

| | |
|---|---|
| Butylglycol | 6.00 g |
| Monoethanolamine | 0.60 g |
| Hydroxyethylcellulose sold by Union Carbide and Carbon under the trade mark "Cellosize W.P.3" | 15 g |
| Water q.s.p. | 100 g |

This composition is applied for 20 minutes to chestnut hair containing 30 percent to 70 percent gray hair.

This composition is applied for 20 minutes to chestnut hair containing 30 percent to 70 percent gray hair.

EXAMPLE 30

The following composition is prepared :

Dyes 1,8-bis- γ-aminopropylamino anthraquinone................0.15 g 1-diethylamino ethylamino-2-nitro-4-N,N dihydroxyethylamino benzene dihydrochloride.....................0.6 g 4-N-methylamino-3-nitro-1-N-β-aminoethylamino benzene....0.25 g /⁻1-hydroxy-4- (γ-methylmorpholinium) propylamino anthraquinone_7methyl sulfate...........................0.1 g 2-β-aminoethylamino anthraquinone........................0.2 g 1,5 di- (β-aminopropylamino) anthraquinone...............0.3 g 1-dimethylamino-3-amino ethylamino-4-nitro benzene................................................0.3 g 1-methylamino-4-amino propylamino anthraquinone..........0.3 g 1-amino propylamino anthraquinone........................0.15 g 1,4-diamino-5-γ-aminopropylamino anthraquinone...........0.4 g 3-nitro-4-β-aminoethylamino anisole monohydrochloride....0.2 g Carrier Lauric acid..............................................1.00 g Diethanolamide of copra..................................1.00 g Lauryl sodium sulfate oxyethylenated with 2 moles of ethylene oxide..........................................5.00 g

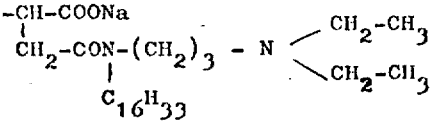
1.00 g

R : hydrocarbon radical derived from fatty acids of copra

4.6 g

R= octylphenyl

0.4 g

R hydrocarbon radical derived from lanolin alcohols obtained by catalytic hydrogenation of lanolin.

Butylglycol..............................................6.00 g

Monoethanolamine.........................................0.60 g

Hydroxyethylcellulose, sold by Union Carbide and Carbon under the trade mark "Cellosize W.P. J"..................15.00 g Water q.s.p. ............................................100 g After shampooing a dark chestnut shade is obtained masking the gray hair.

After shampooing a dark chestnut shade is obtained masking the gray hair.

EXAMPLE 31 aminohydroquinone .................................................. 0.4 g 2,5-dihydroxy monomethylamino benzene ............................... 0.7 g 6-hydroxy-5-methyl-2,4-diaminobenzene ............................... 1.5 g 4-hydroxy-3-amino-anisole hydrochloride ............................. 1.6 g 2,5-diamino-4-methyl phenol dihydrobromide .......................... 0.5 g 4-NN-diethylamino-2,6-diaminophenol trichlorhydrate ................. 0.6 g diethanolamide of copra ............................................. 3.0 g

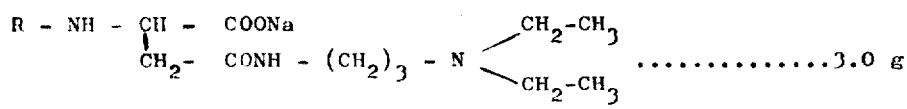
................ 3.0 g

R : hydrocarbon derived from the fatty acids of copra $C_{12}H_{25}O$ —$[C_2H_3O \ (CH_2OH)\frac{7}{4}]$—H .................................. 5.5 g $R-O-[C_2H_3O \ (CH_2OH)\frac{7}{2}]$—H ............................................ 0.5 g R: hydrocarbon radical derived from lanolin alcohols obtained by catalytic hydrogenation of lanolin.

Sodium bisulfite 33° Bé ............................................. 1 cc

NaOH 5N q.s.p. ............................... pH 7

Water q.s.p. ........................................................ 100 g

This solution is mixed with its own volume of hydrogen peroxide at 20 volumes. When applied to very gray hair for 25 to 30 minutes, the result, after shampooing, is a brown shade.

The hair, after treatment, is very soft and easy to manage.

EXAMPLE 32

The following composition is prepared:

| | | |
|---|---|---|
| Cetyl-stearyl alcohol | 20 | g |
| Oleyl diethanolamide | 4 | g |
| $C_{16}H_{37}O-[C_2H_3O(CH_2OH)]_{10}$—H | 6 | g |
| Dyes | | |
| 2,4-diamino-anisol sulfate | 0.048 | g |
| Resorcine | 0.420 | g |
| Meta-aminophenol base | 0.150 | g |
| Nitro-para-phenylene-diamine | 0.085 | g |
| Para-toluylene-diamine | 0.004 | g |
| Sodium salt of ethylene amine tetracetic acid | 1.000 | g |
| Sodium bisulfite d= 1.32 | 1.200 | g |
| Water q.s.p. | 100 | g |

30 g of that composition are mixed with hydrogen peroxide at 20 volumes.

A smooth dense cream is obtained which is pleasant to use.

When applied to 100 percent gray hair for 30 minutes the result after shampooing and rinsing is a pleasant blond shade. The hair after treatment is very soft and easy to manage, the hair is shiny, silky and pleasant to touch.

EXAMPLE 33

The following composition is prepared :

Dyes

1,8-bis-γ-aminopropylamino anthraquinone ........................... 0.15 g 1-diethylamino ethylamino-2-nitro-4-NN-dihydroxyethylamino benzene dihydrochloride ................................. 0.6 g 4-N-methylamino-3-nitro-1-N-β-aminoethylamino benzene ............... 0.25 g

[1-hydroxy-4-(γ-methylmorpholinium) propylamino anthraquinone] methylsulfate ............................. 0.1 g

EXAMPLE 33 – Continued

| | |
|---|---|
| 2-β-aminoethylamino anthraquinone | 0.2 g |
| 1,5-di-(β-aminopropylamino) anthraquinone | 0.3 g |
| 1-dimethylamino-3-aminoethylamino-4-nitro benzene | 0.3 g |
| 1-methylamino-4-amino-propylamino anthraquinone | 0.3 g |
| 1-amino-propylamino anthraquinone | 0.15 g |
| 1,4-diamino-5-aminopropylamino anthraquinone | 0.4 g |
| 3-nitro-4-β-aminoethylamino anisole monohydrochloride | 0.2 g |

Carrier

| | |
|---|---|
| Lauric acid | 1.00 g |
| Diethanolamide of copra | 1.00 g |
| Lauryl sodium sulfate oxyethylenated with 2 moles of ethylene oxide | 5.00 g |

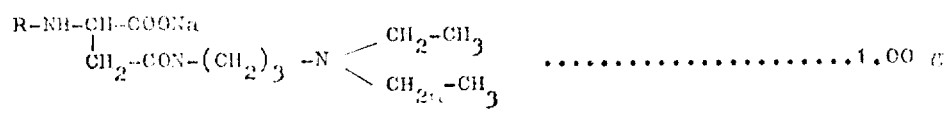

..............1.00 g

R = hydrocarbon radical derived from fatty acids of copra

5.00 g

R = hydrocarbon radical derived from alcohols obtained by the catalytic hydrogenation of commercial isostearic acid.

| | |
|---|---|
| Butylglycol | 6.00 g |
| Monoethanolamine | 0.60 g |
| Hydroxyethylcellulose sold by Union Carbide and Carbon under the trade mark "Cellosize W.P.3" | 15 g |
| Water q.s.p. | 100 g |

This composition is applied for 20 minutes to chestnut hair containing 30 percent to 70 percent gray hair. After shampooing a dark chestnut shade is obtained masking the gray hair.

EXAMPLE 34

The following composition is prepared :

Dyes

| | |
|---|---|
| 1,8-bis-γ-aminopropylamino anthraquinone | 0.15 g |
| 1-diethylamino ethylamino-2-nitro-4-NN dihydroxyethylamino benzene dihydrochloride | 0.6 g |
| 4-N-methylamino-3-nitro-1-N-β aminoethylamino benzene | 0.25 g |
| [1-hydroxy-4-(γ-methylmorpholinium) propylamino anthraquinone] methyl sulfate | 0.1 g |
| 2-β-aminoethylamino anthraquinone | 0.2 g |
| 1,5 di-(β-aminopropylamino) anthraquinone | 0.3 g |
| 1-dimethylamino-3-amino ethylamino-4-nitro benzene | 0.3 g |
| 1-methylamino-4-amino propylamino anthraquinone | 0.3 g |
| 1-amino propylamino anthraquinone | 0.15 g |
| 1,4-diamino-5-γ-aminopropylamino anthraquinone | 0.4 g |
| 3-nitro-4-β-aminoethylamino anisole monohydrochloride | 0.2 g |

EXAMPLE 34—Continued

Carrier

| | |
|---|---|
| Lauric acid | 1.00 g |
| Diethanolamide of copra | 1.00 g |
| Lauryl sodium sulfate oxyethylenated with 2 moles of ethylene oxide | 5.00 g |

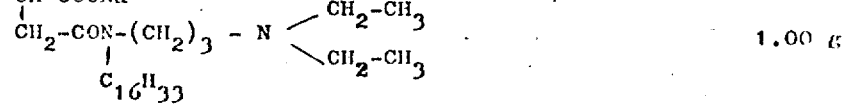

1.00 g

R : hydrocarbon radical derived from fatty acids of copra.

$$RO + [C_2H_3O(CH_2OH)]_{\overline{6}} H \quad 5.00 \text{ g}$$

R = hydrocarbon radical derived from alcohols obtained by the catalytic hydrogenation of commercial isostearic acid.

| | |
|---|---|
| Butylglycol | 6.00 g |
| Monoethanolamine | 0.60 g |
| Hydroxyethylcellulose, sold by Union Carbide and Carbon under the trade mark "Cellosize W.P. 3" | 15.00 g |
| Water q.s.p. | 100 g |

This composition is applied for 20 minutes to chestnut hair containing 30 percent to 70 percent gray hair. After shampooing a dark chestnut shade is obtained masking the gray hair.

EXAMPLE 35

Peptization of barium sulfate

Barium sulfate is precipitated by pouring a 2.4 N solution of barium chloride into a 1.6 N solution of sodium sulfate, at the boil, and while stirring. The precipitate is washed by simple decantation. It is very fine and few of its particles have a dimension greater than 4 μ.

5 percent of the following product is added to the barium sulfate $$R_1O + [C_2H_3O(CH_2OH)]_{\overline{n}} H$$

In this formula $R_1$ represents a hydrocarbon derived from the alcohols obtained by hydrogenation of the lanolin sold under the trademark "Elrolan". The other compounds in which n= 2, 3 and 7,6 may also be used.

The product is carefully dried and is found to be perfectly wetted by oil so that it may be introduced into emulsions.

The example of barium sulfate is given purely by way of illustration. Other pigments such as titanium oxide, iron oxide, and Guimet blue may also be peptized.

EXAMPLE 36

Composition for use as lip rouge

This example illustrates the use of the product:

$$R_1O + [C_2H_3O(CH_2OH)]_{\overline{n}} H$$

for peptizing metallic particles.

10 g of "Bentone 38" (trademark of National Lead Co.) which is an organophilic bentonite (a cationic colloidal earth) are dispersed in a liquid consisting of 88 g of paraffin oil and 2 g of the product $$R_1O + [C_2H_3O(CH_2OH)]_{\overline{n}} H$$

in which $R_1$ has the same significance as in Example 35, and excellent homogenization is produced by vigorous stirring. The dispersion thus obtained is dispersed in the remaining components of a lip rouge, and 1 to 15 percent of flakes of aluminium paint are introduced into the mixture, which is kept more or less liquid.

What is claimed is:

1. A composition for dyeing hair comprising an aqueous solution of a hair dye in amounts sufficient to color said hair and a compound having the formula $$R_1O + [C_2H_3O(CH_2OH)]_{\overline{n}} H$$

wherein the repeating group is linear, n has a statistical average value greater than 1 and equal to or less than 10, $R_1$ is selected from the group consisting of lipophilic alkyl, alkenyl and alkylaryl, having from 8 to 30 carbon atoms, said compound being present in amounts ranging from 1–60 percent by weight of said composition and said composition having a pH ranging from about 3–9.

2. A composition for dyeing hair comprising an aqueous solution of a hair dye in amounts sufficient to color said hair and at least one compound of the formula

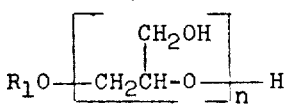

wherein $R_1$ is selected from the group consisting of alkyl having 8-22 carbon atoms, alkenyl having 8-22 carbon atoms, alkyl aryl having 8-22 carbon atoms wherein the alkyl moiety has 1-18 carbon atoms and the hydrocarbon radical derived from lanolin alcohols obtained by the catalytic hydrogenation of lanolin, $n$ has a statistical average value greater than 1 and equal to or less than 10, said compound being present in amounts ranging from 1-60 percent by weight of said composition and said composition having a pH ranging from about 3-9.

3. The composition of claim 2 wherein $R_1$ is alkenyl.

4. The composition of claim 2 wherein $R_1$ is alkylaryl.

5. The composition of claim 2 wherein $R_1$ is the hydrocarbon radical derived from lanolin alcohols obtained by the catalytic hydrogenation of lanolin.

6. The composition of claim 2 wherein $R_1$ is alkyl.

7. A method of dyeing hair comprising applying to said hair the composition of claim 2 in amounts effective to dye said hair.

* * * * *

UNITED STATES PATENT OFFICE
CERTIFICATE OF CORRECTION

Patent No. 3,865,542          Dated February 11, 1975

Inventor(s) Gregoire Kalopissis and Guy Vanlerberghe

It is certified that error appears in the above-identified patent and that said Letters Patent are hereby corrected as shown below:

In the Heading

Please add the following --

[30] Foreign Application Priority Data

| Date | Country | Number |
|---|---|---|
| April 23, 1965 | Luxembourg | 48458 |
| Nov. 22, 1965 | Luxembourg | 49902 |
| April 6, 1966 | Luxembourg | 50850 |
| Dec. 1, 1967 | France | 130713 |

--.

Signed and Sealed this ninth Day of September 1975

[SEAL]

Attest:

RUTH C. MASON  
*Attesting Officer*

C. MARSHALL DANN  
*Commissioner of Patents and Trademarks*